April 25, 1933. H. KOPPERS 1,905,108
DISTILLATION OF GAS LIQUOR
Filed March 16, 1931
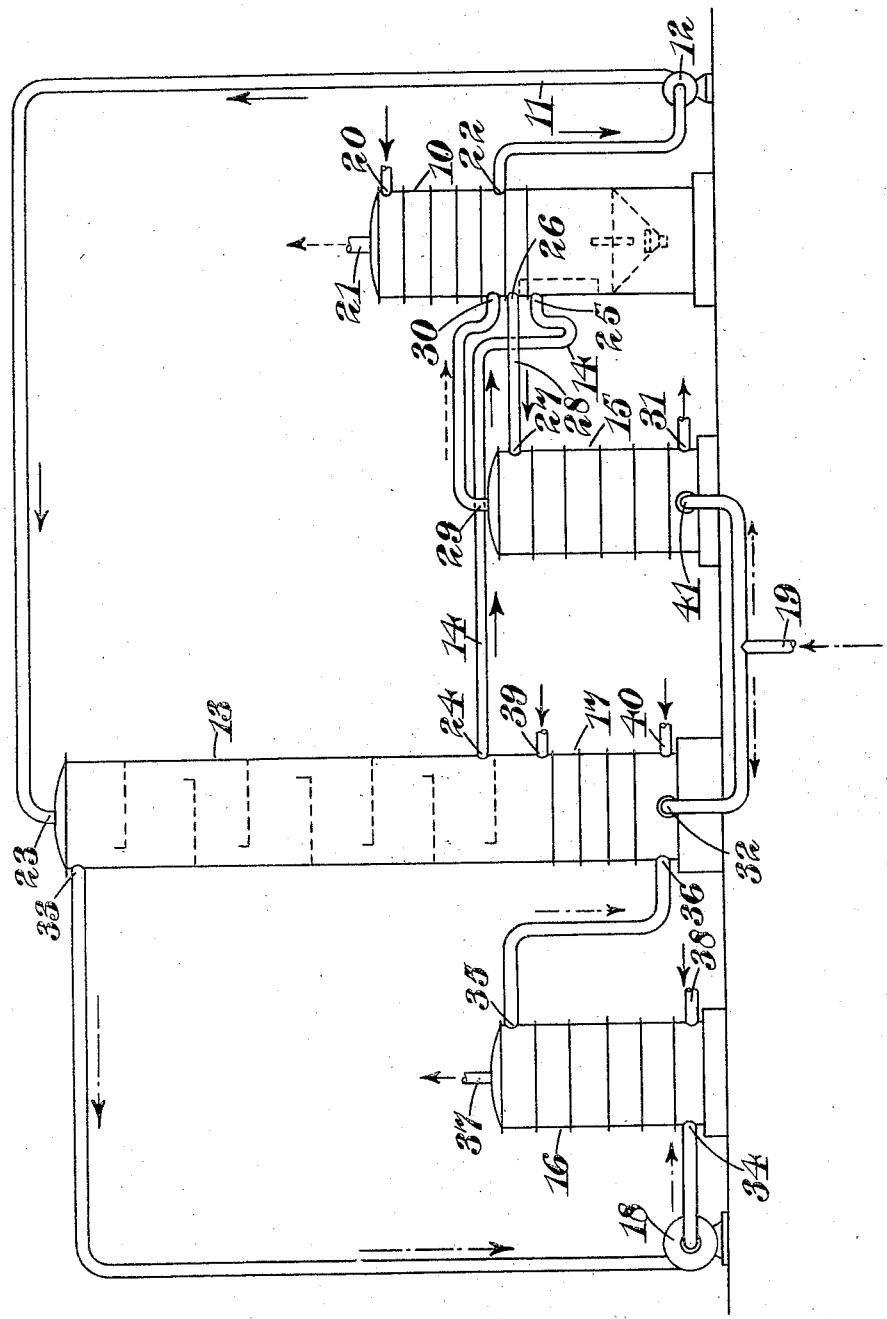
Inventor
Heinrich Koppers
By Henry Love Clarke
his atty Patented Apr. 25, 1933

1,905,108

UNITED STATES PATENT OFFICE

HEINRICH KOPPERS, OF ESSEN, GERMANY, ASSIGNOR, BY MESNE ASSIGNMENTS, TO THE KOPPERS COMPANY OF DELAWARE, OF PITTSBURGH, PENNSYLVANIA, A CORPORATION OF DELAWARE

DISTILLATION OF GAS LIQUOR

Application filed March 16, 1931, Serial No. 523,101, and in Germany June 15, 1929.

I have filed application in Germany on June 15, 1929.

This invention is for improvements in or relating to the distillation of gas liquor.

The invention provides a process for working an ammonia water distillation apparatus which enables the recovery not only of the ammonia contained therein but also of any dissolved volatile acids (phenol and the like) and bases (pyridine and the like) to be made in one operation.

The gas liquor coming from the still used for the recovery of the so-called free ammonia (which liquor, in addition to the fixed ammonia compounds, contains also the above-mentioned acids and bases) is treated before the ordinary distillation with lime for the recovery of fixed ammonia, with a quantity of steam at about 100° C. circulating in a closed cycle. In consequence of the volatility of the above-mentioned organic acids and bases in steam, these materials are taken out of the gas liquor. The time in which the gas liquor is in contact with the steam circulating in a closed cycle is so arranged that the entire volatile acids and bases contained therein are removed.

The removal of acids and bases from the gas liquor may be carried out conveniently in a scrubber through which the liquor to be treated is pumped, and steam is caused to circulate through the scrubber in a closed cycle in counter current to the liquor by means of a rotary pump or in any other suitable manner. The steam carrying the acids and bases may be taken off from the top of the scrubber and conducted through an acid and alkali scrubber from which it may then be conducted again into the bottom of the gas liquor scrubber.

In order to secure continuity of the process the water condensed as a result of unavoidable heat losses from the steam circulating in closed cycle for the recovery of acids and bases, is continually replaced by withdrawing steam which is required in the closed cycle circulation from that employed to heat the gas liquor still in which fixed ammonia is recovered.

An advantage of the process of the invention is that the removal of volatile organic acids and bases is effected in a characteristic manner with a relatively small amount of steam, which however, passes through the gas liquor for a considerable time, and the cost of the removal of the materials mentioned from the gas liquor is very low, and the operation of the distillation plant is very simple.

The accompanying drawing represents diagrammatically an arrangement of plant suitable for carrying out the process of the invention. In the drawing 10 represents a still for the distillation of gas liquor for the recovery of free ammonia, 15 represents a similar still for distillation of the gas liquor after treatment with lime for the recovery of fixed ammonia, 13 represents a scrubber for the purpose of treating the gas liquor with steam and underneath this scrubber is situated another scrubber 17 which, in conjunction with a similar scrubber 16, is employed for the purpose of freeing the steam from acidic and basic vapours.

In carrying out the process of the invention the gas liquor is introduced into the still 10 at the inlet 20, and the free ammonia together with some carbon dioxide and sulphuretted hydrogen is driven off and passes out of the still at 21, the liquor thus treated passing out of the apparatus at 22, from whence it is pumped by the pump 12 through the pipe 11 into the inlet 23 of the scrubber 13. The liquor passes down the scrubber 13 in counter current to steam passed in at the bottom of the scrubber in the inlet 32. After treatment with the steam the liquor leaves the scrubber at 24 and passes by the pipe 14 into the lower part of the still 10, where it is treated with lime and passes out at the outlet 26 through the pipe 28 and into the still 15 at the inlet 27 where it is heated with steam introduced at 41, and the ammonia which is freed in the liquor by the treatment with lime is driven off and escapes at the opening 29, and passes into the still 10 at the opening 30 from whence it leaves the apparatus with the other ammonia vapour at 21. The purified gas liquor leaves the apparatus at the bottom of the still 15 at the outlet 31. The steam introduced at the opening 32 and bottom of the scrubber 13 meets the liquor passing down the scrubber 13 and extracts therefrom the volatile acids and bases and passes out at the outlet 33 from whence it is pumped by the pump 18 through the scrubber 16. Through the latter acid passing in at the inlet 37 and out at the outlet 38 extracts the basic vapours (pyridine and the like) from the steam and the latter passing out of the scrubber at the outlet 35 is introduced at the inlet 36 to the bottom of the scrubber 17 where it meets an alkali liquor introduced at the inlet 39 which takes out the acid (phenol and the like) vapours from the steam, the alkali liquor leaving the scrubber at the outlet 40. After passing through the scrubber 17 the steam is then pure enough to continue in its cycle and extract further quantities of acid and basic vapours.

The steam pipe 19 is branched so that part is employed for heating the steam 15 and part is used for circulation in the scrubber 13. In carrying out the process in this way the hot steam entering the scrubber 13 from the pipe 19 at a temperature, for example, of 108° C. is so expanded that the temperature is brought down to about 100° C. whilst the gas liquor after removal of free ammonia which enters the scrubber at the inlet 23 is at a temperature very little below 100° C. If the liquor entering the scrubber 13 contains, as is usually the case, about three grammes of phenol and one gramme of pyridine per litre then in carrying out the process as hereinbefore described, enough phenol and pyridine will be removed by the steam circulating in the scrubber 13 that the liquor leaving at the outlet 24 will contain no more than about 0.05 to 0.08 gramme of phenol per litre and 0.05 to 0.1 gramme of pyridine per litre, that is to say, the gas liquor is for practical purposes free of phenol and pyridine.

The full line arrows in the drawing show the flow of the liquors, the broken line arrows the flow of ammonia vapour and the chain line arrows the flow of the steam.

I claim:—

1. A process for the distillation of gas liquor and recovery of by-products therefrom which process consists in bringing the hot gas liquor after distillation therefrom of free ammonia into intimate contact with steam, and thereafter treating it (for example with lime) and further distilling it for the recovery of fixed ammonia.

2. A process for the distillation of gas liquor for the recovery of by-products therefrom which process consists in bringing the hot gas liquor after distillation therefrom of free ammonia into intimate contact with steam circulating in a cycle in which it is brought repeatedly into contact with gas liquor and freed from acid and basic vapours after each contact with the said liquor, and thereafter treating the said liquor with lime and further distilling it for the recovery of fixed ammonia.

3. A process for the distillation of gas liquor as claimed in claim 2, in which the steam circulating in a closed cycle is washed with acid and basic liquors after each contact with the gas liquor.

In testimony whereof I affix my signature.

HEINRICH KOPPERS.